(12) United States Patent
Robinson et al.

(10) Patent No.: US 8,674,314 B2
(45) Date of Patent: Mar. 18, 2014

(54) SOLID-STATE NUCLEAR DETECTOR

(75) Inventors: Joshua A. Robinson, Spring Mills, PA (US); Douglas E. Wolfe, St. Marys, PA (US)

(73) Assignee: The Penn State Research Foundation, University Park, PA (US)

( * ) Notice: Subject to any disclaimer, the term of this patent is extended or adjusted under 35 U.S.C. 154(b) by 422 days.

(21) Appl. No.: 12/827,811

(22) Filed: Jun. 30, 2010

(65) Prior Publication Data

US 2010/0327171 A1    Dec. 30, 2010

Related U.S. Application Data

(60) Provisional application No. 61/221,818, filed on Jun. 30, 2009.

(51) Int. Cl.
*G01T 3/08* (2006.01)

(52) U.S. Cl.
USPC ............. 250/370.05; 250/370.01; 250/370.06

(58) Field of Classification Search
USPC .................................................... 250/370.05
See application file for complete search history.

(56) References Cited

U.S. PATENT DOCUMENTS

| | | | |
|---|---|---|---|
| 4,419,578 A | 12/1983 | Kress | |
| 4,857,739 A | 8/1989 | Phelps | |
| 5,321,269 A | 6/1994 | Kitaguchi et al. | |
| 6,259,099 B1 | 7/2001 | Foulon et al. | |
| 6,479,826 B1 * | 11/2002 | Klann et al. | 250/370.05 |
| 6,737,648 B2 | 5/2004 | Fedder et al. | |
| 7,164,138 B2 | 1/2007 | McGregor et al. | |
| 7,233,007 B2 | 6/2007 | Downing et al. | |
| 7,372,009 B1 * | 5/2008 | Losee et al. | 250/200 |
| 7,573,037 B1 | 8/2009 | Kameshima et al. | |
| 7,589,327 B2 | 9/2009 | Kerwin | |
| 2005/0258372 A1 * | 11/2005 | McGregor et al. | 250/390.01 |
| 2009/0302226 A1 * | 12/2009 | Schieber et al. | 250/370.02 |
| 2010/0213380 A1 * | 8/2010 | Kub et al. | 250/370.05 |

OTHER PUBLICATIONS

International Search Report, PCT/US 10/40636, listing relevant art cited by the International Searching Authority, Oct. 14, 2010.

* cited by examiner

*Primary Examiner* — Marcus Taningco
(74) *Attorney, Agent, or Firm* — McKee, Voorhees & Sease, P.L.C.

(57) ABSTRACT

The present invention provides an innovative solid-state neutron detector that exhibits superior neutron-sensitivities. One embodiment of the present invention includes a Gadolinium-oxide ($Gd_2O_3$)-based neutron detector that is highly sensitive to the presence of neutrons, and experiences significant changes in film conductivity, capacitance or both as a result of thermal neutron exposure thereby providing for detection of nuclear radiation.

19 Claims, 13 Drawing Sheets

US 8,674,314 B2

SOLID-STATE NUCLEAR DETECTOR

CROSS-REFERENCE TO RELATED APPLICATIONS

This application claims priority under 35 U.S.C. §119 of a provisional application Ser. No. 61/221,818 filed Jun. 30, 2009, which application is hereby incorporated by reference in its entirety.

FIELD OF THE INVENTION

The present invention relates generally to a solid-state nuclear radiation detector, and more particularly to a Gadolinium-oxide based nuclear radiation detector.

BACKGROUND OF THE INVENTION

The statements in this section merely provide background information related to the present invention and may not constitute prior art.

Detection of nuclear radiation (gamma and neutron) has been of interest since the inception of nuclear technology. As a result, significant research has advanced radiation technology through the introduction and optimization of ionization chambers, proportional counters, scintillation detectors, photomultiplier tubes, and semiconductor diode detectors. At the very heart of this effort has been the fundamental understanding of materials that demonstrate measurable changes when in contact with nuclear and radiological sources. Therefore, there is a need in the art to provide a detector using materials that demonstrate measurable changes when in contact with nuclear and radiological sources.

To this end, multiple gas-based and solid state detectors have been developed which exploit materials with exceedingly high neutron capture cross sections. Therefore, a need has been identified in the art to provide a detector using detection materials with an exceedingly high neutron capture cross section.

Helium-3 ($^3$He) has been the bench-mark for new radiologically sensitive materials since its inception in 1955, and has been widely available commercially for nearly 40 years. Silicon-based solid-state detectors have also been developed which improve upon the robustness, power consumption, and energy resolution compared to their scintillator and ionization chamber counterparts. Recently, Boron-10 ($^{10}$B) bearing solid state detectors have also shown promise as a neutron detection material, and have demonstrated higher detection efficiencies than its He$^3$ counterpart under the same conditions. Therefore, a need has been identified in the art to provide a solid state detector having a neutron detection material with detection efficiencies that improve over the state-of-the-art.

With the advancement of nuclear detectors and their placement out in the field or in operation, and possible subsequent unwanted detection after being put into operation, a need has arisen for nuclear detectors to be cloaked from view or from being detected for providing covert nuclear radiation detection. Therefore, according to at least one object, feature or advantage of the present invention, a transparent nuclear radiation detector is provided to avoid detection after being "placed" or for use in applications where visible transparency is desired.

Given the increasing diversity of applications and situations where radiation detection is desired, nuclear radiation detectors stand to benefit from having increased robustness and flexibility. Therefore, a further object, feature or advantage of the present invention is to provide a multifunctional, transparent, flexible, nuclear detector (MTFND) having increased flexibility and robustness.

Still, a further object, feature or advantage of the present invention is to provide a nuclear radiation detector that is capable of sensing and detecting nuclear radiation using multiple and/or hybrid sensing and detection modes.

Another object, feature or advantage of the present invention is to provide large area, structurally flexible substrate for the application of the detector to planar, curved, and the mixed combination of surfaces.

Another object, feature or advantage of the present invention is to provide a multifunctional nuclear radiation detector having multiple potential charge carrier generation mechanisms where capacitance and/or current pulses from the detector provide forensic detection of nuclear radiation.

A further object, feature or advantage of the present invention is to provide a nuclear radiation detector according to the present invention that includes a wireless communications architecture for controlling operation of the detector or for broadcasting detection readings.

These and/or other objects, features, or advantages of the present invention will become apparent. No single embodiment of the present invention need achieve all or any particular number of the foregoing objects, features, or advantages.

SUMMARY OF THE INVENTION

In one embodiment, the invention is a solid-state nuclear radiation detector. The detector has a substrate layer for detecting at least fast neutrons associated with a radiation source. An active material layer is deposited onto the substrate layer and detects at least thermal neutrons associated with the radiation source. Together at least the substrate and active material layers detect charged or ionized particles associated with the radiation source. The detector has at least two separate detection modes using electrical properties of the substrate and active material layers for detecting a type of radiation associated with the radiation source.

In another embodiment, the invention is a method for detecting nuclear radiation. The method includes depositing a radiation sensitive film onto a substrate. A contact is attached to the radiation sensitive film to form a solid-state detector. When the solid-state detector is exposed to radiation, fast neutrons are detected in the substrate, thermal neutrons are detected in the radiation sensitive film and charged or ionized particles are detected in both the substrate and radiation sensitive film. At least two separate detection modes are monitored using electrical properties of the substrate and radiation sensitive film for detecting the type of radiation.

DETAILED DESCRIPTION OF THE PREFERRED EMBODIMENT

One or more of the foregoing needs may be achieved by a detector according to one or more aspects of the present invention.

Figure 1A:
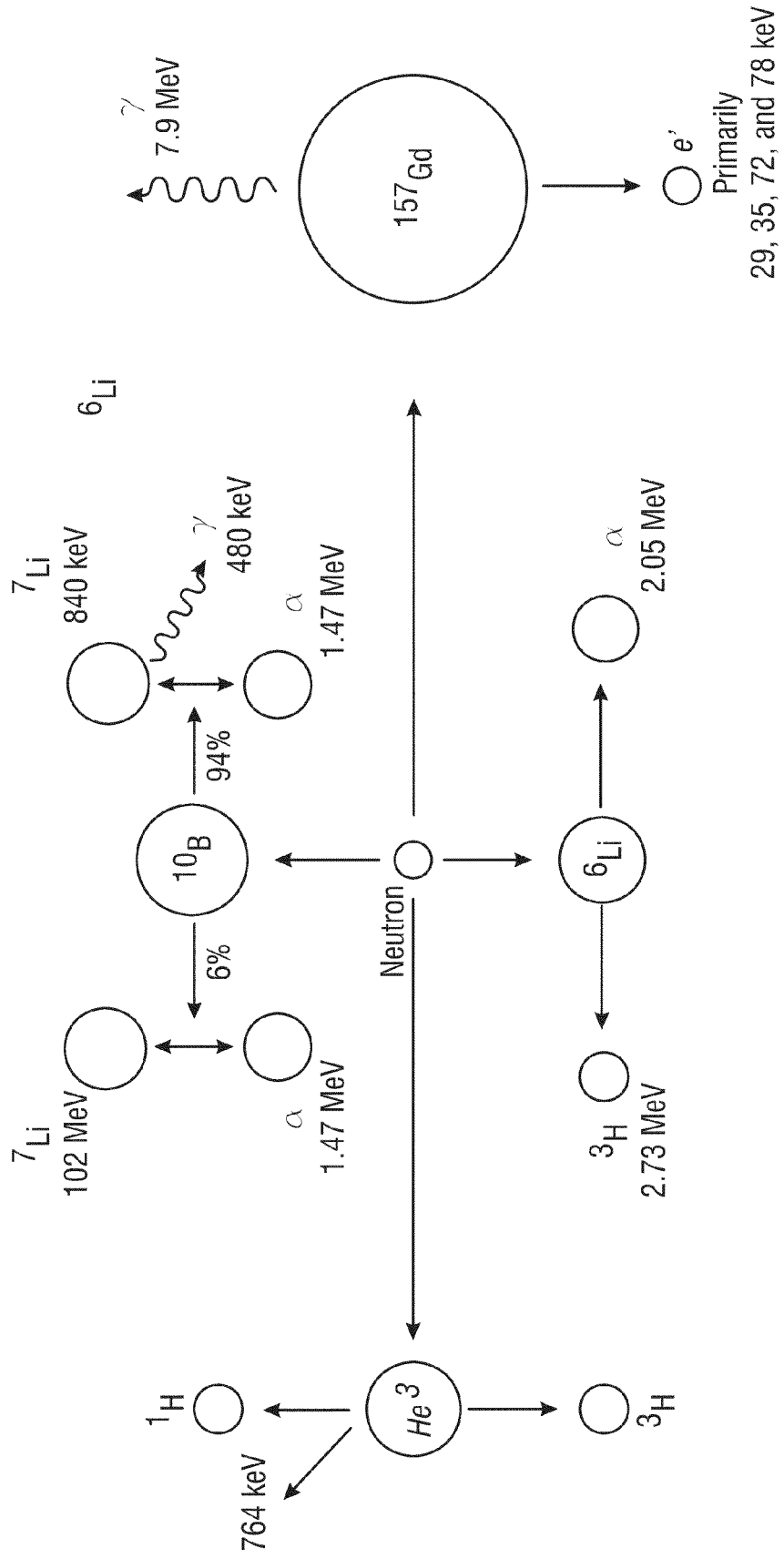
FIG. 1(a) is an illustration of products associated with the neutron/element reaction.
Figure 1B:
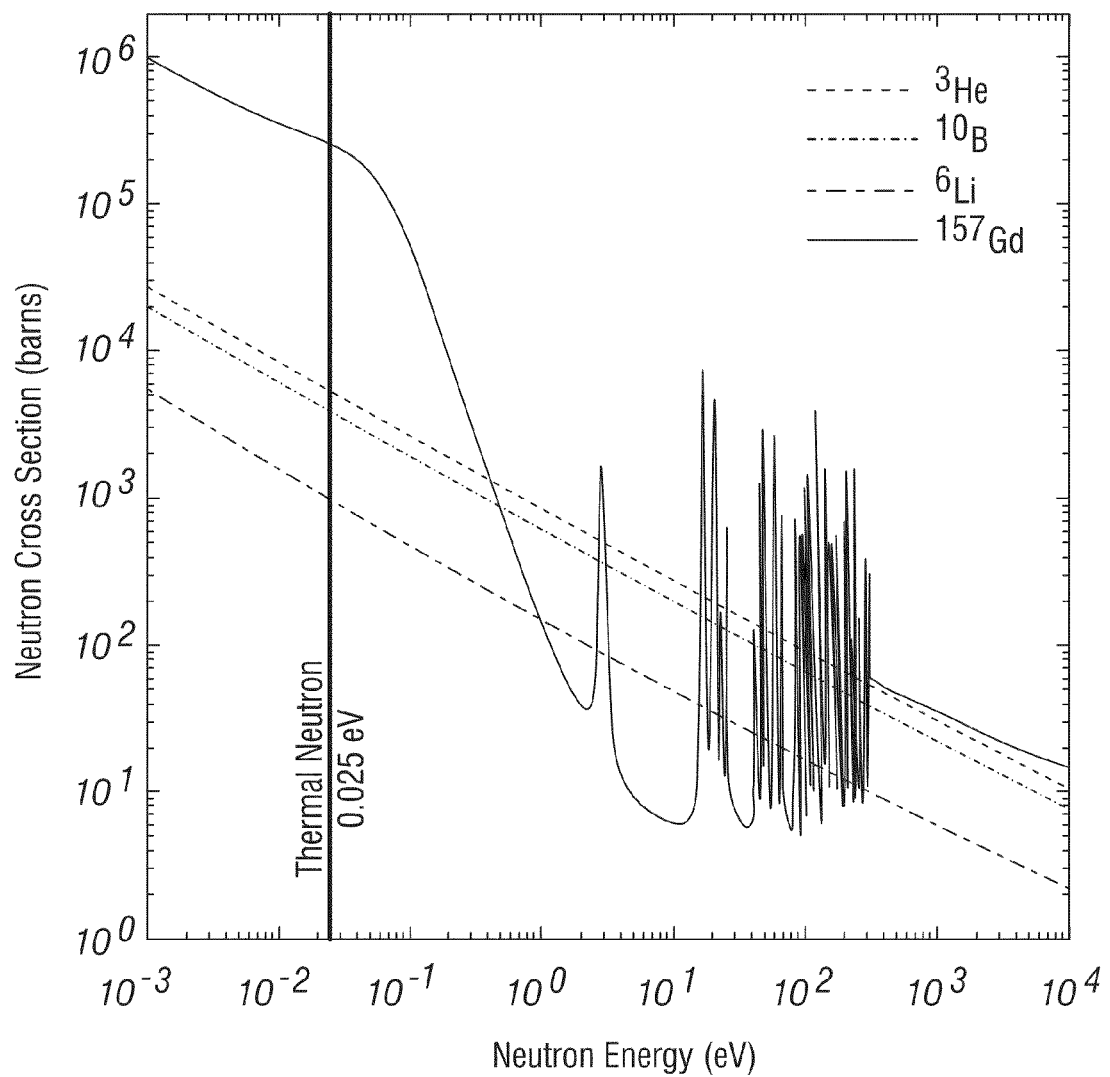
FIG. 1(b) is a plot illustrating neutron capture cross section of gadolinium-157, boron-10, lithium-6, and helium-3 as a function of neutron energy.

A figure of merit for nuclear radiation sensitive materials is the intrinsic property: neutron capture cross section (measured in barns). The capture cross section is a direct indicator of the probability of interaction between a neutron and element of choice, thus as the cross section increases so does the probability of interaction. Materials for radiation detection are chosen based on this intrinsic property, of which $^3$He, $^{10}$B, $^6$Li, and $^{157}$Gd exhibit some of the largest cross sections for thermal neutrons. FIG. 1(b) demonstrates the neutron cross section in barns for these elements as a function of neutron kinetic energy. Helium, boron, and lithium exhibit large thermal neutron cross sections (5333, 3840, 940b, respectively), but it is Gadolinium that exhibits the largest thermal neutron capture cross section—$^{nat}$Gd~49700 and $^{157}$Gd~259000 barn (where 1 barn=$10^{-28}$ m$^{-2}$). As a result, Gadolinium converts neutrons into charges particles more efficiently than any other element or compound. On the other hand, Gadolinium is challenging due to its tendency to form a low quality, poorly adherent oxide layer on target surfaces. The interaction of a neutron with any of the aforementioned elements results in the ejection of one or more charged particles and gamma radiation (see FIG. 1(a)). In a preferred aspect of the present invention, gadolinium is the active material in a neutron detector. The utilization of Gd as an active material layer, however, is challenging due to its thermodynamic instability in the presence of oxygen. As a result, it is advantageous to synthesize Gd-bearing materials that exhibit inherent environmental robustness for long-term use in the field. Gadolinium oxide ($Gd_2O_3$) is stable at high temperatures under oxidizing environments, and is thus an attractive alternative to pure Gd. Additionally, $Gd_2O_3$ offers the same advantages of pure Gadolinium, such as a large capture cross section, high conversion efficiency, and capable of multiple modes of sensing/detection, including at least a first detection mode using capacitance, a second detection made using induced conductivity or a third detection made using both capacitance and conductance together. $Gd_2O_3$ can be applied to polymer-based substrate materials, can be doped with other rare earth oxide materials allowing for detector tailorability, and since it is transparent, can be used for applications in which visible transparency is desired (i.e., protective eyewear, windshields, building windows and architecture, road signs, and the like). When deposited on flexible substrates like polymers, the $Gd_2O_3$-based neutron detector can be described as a multifunctional transparent flexible neutron detector (MTFND). MTFNDs allow exploration of radiation induced conductivity and radiation induced strain in indium-tin oxide (ITO)/Gd2O3/polymer/ITO multilayers. Furthermore, all materials for MTFNDs are transparent in visible wavelengths. The polymer substrate also allows for mechanically flexible detection materials. Other benefits of MTFNDs are the neutron-polymer film interactions, thermal stability and fast neutrons, and a high elastic scattering cross section for fast neutrons (E>500 keV) and energetic recoil protons (H nuclei) generated in polymer. Another benefit of MTFND of the present invention is the changing film conductivity and detector electrical properties.

Figure 2:
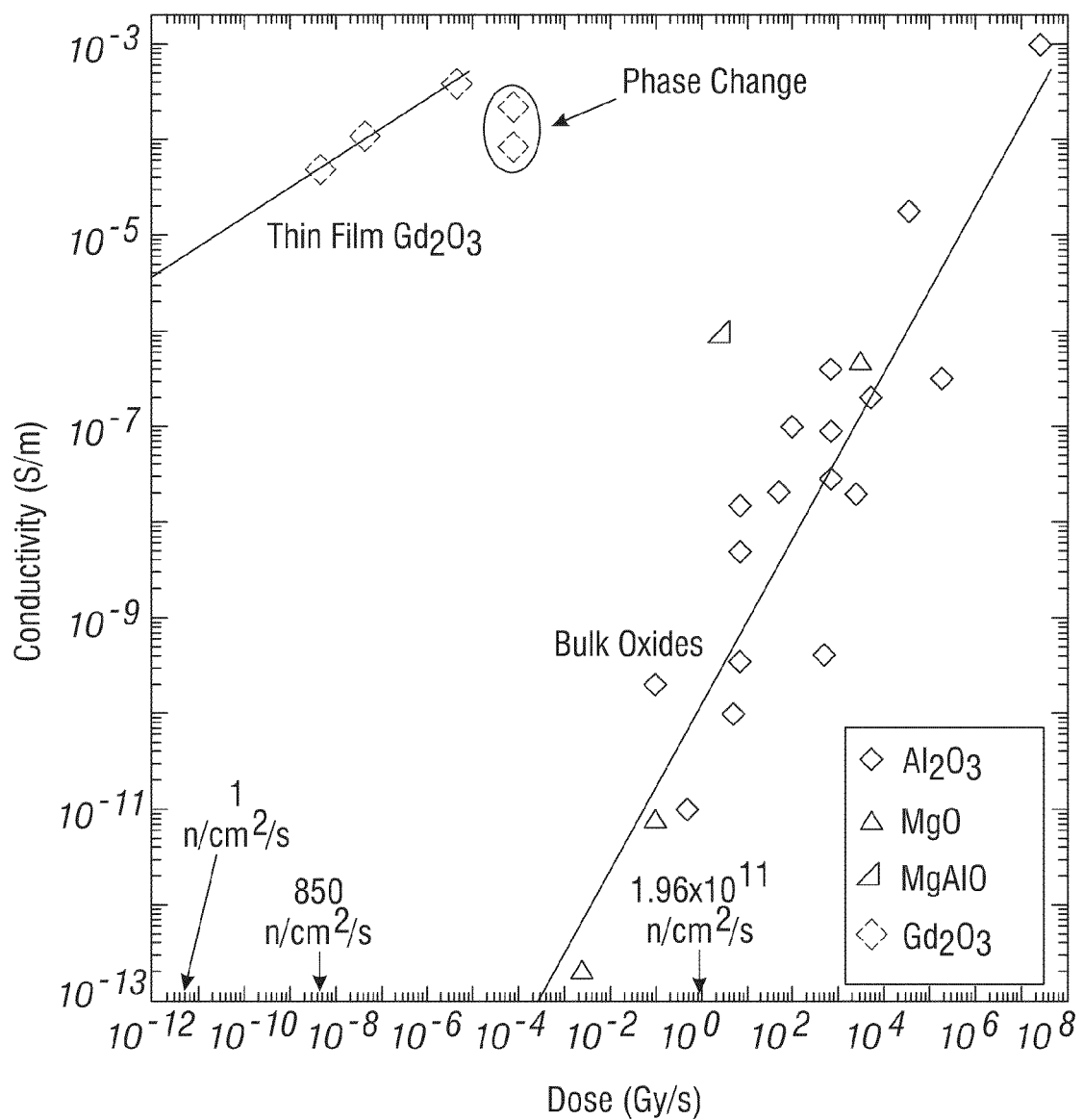
FIG. 2 is a plot illustrating radiation induced conductivity of aluminum-based oxides.

Irradiation of oxide materials induces structural changes through the interaction between the radiation and oxide. Such changes therefore are strongly dependent on the nature of the irradiating particle and the specific material, otherwise constituted in the phenomenon associated with the interaction of oxide materials (dielectrics) with nuclear radiation, known as radiation-induced conductivity (RIC). RIC is a by-product of the radiation-induced excitation of valence electrons into the conduction band, resulting in significant increases of the electrical conductivity of oxide materials typically used as fusion insulators in nuclear reactors. Aluminum-based complex oxides, often used as fusion reactor insulators, utilize materials that exhibit neutron cross sections that are very small (<1 barn or $<10^{-23}$ m$^{-3}$), however the radiation induced conductivity is still significant even for small doses. FIG. 2 is a comparison of the electrical conductivity of aluminum-based oxides as a function of ionizing dose along with their respective thermal neutron cross sections compared to natural gadolinium. Significant, measurable conductivity changes occur even for the smallest of ionizing doses in the case of $Al_2O_3$, MgO, and $MgAl_2O_4$. Oxide materials such as $Al_2O_3$, are not only vital as fusion insulators in nuclear reactors, but are also used in the microelectronics industry as high quality gate dielectrics in field-effect transistors. These transistors rely heavily on the conductance of the dielectric films remaining $<10^{-11}$ Siemens, however, as demonstrated in FIG. 2, exposure to nuclear radiation results in an increase in oxide conductivity. The development of Gd-bearing oxides presents a unique opportunity for exploration and exploitation of the Radiation Induced Conductivity (RIC) phenomenon. RIC a product of radiation-induced excitation of valence band (VB) electrons into conduction band (CB) resulting in significant increases in electrical conductivity. The effects of radiation on $Al_2O_3$-based oxides is well known; $Al_2O_3$-based oxides have neutron scattering and absorption cross sections that are pretty small (~0.23 barn), but the RIC is still measureable for small doses. Capacitance and dielectric loss of oxides are strong functions of radiation induced electronic charge, thus AC conductivity will increase in proportion to the increase in radiation. Assuming RIC is proportional to scattering and absorption cross sections, the $Gd_2O_3$ detector of the present invention is capable of single neutron detection by possessing a neutron capture cross section nearly 225,000 times greater than oxides used in the nuclear reactor industry, and 10 times greater than $^3$He.

Polycrystalline $Gd_2O_3$ films are deposited on substrates that may include, but are not limited to, polymers, metals, alloys, semiconductors (single crystal and polycrystalline), and oxides (single crystal or polycrystalline). For example, substrate materials could include at least silicon, silicon carbide, sapphire, gadolinium oxide, glass, polymer-based materials such as polyethylene, polyethylene terephthalate, polystyrene, polypropylene, polymethyl bethacrylate, polyvinylchloride and combinations of the same. The present invention contemplates that the substrate may be an active material other than $Gd_2O_3$; this may include other transparent, neutron sensitive materials, such as for example, $Sm_2O_3$ or Li-based oxides. The present invention also contemplates that $Gd_2O_3$ films may be single crystal, polycrystalline, amorphous, nanocomposite, or a mixed combination of the aforementioned materials. According to other aspects of the present invention, the active material layer may include gadolinium oxide, gadolinium nitride, gadolinium oxide doped with boron oxide, lithium oxide or a combination of oxides, gadolinium oxide doped with rare earth oxides such as oxides of: lanthanum, cerium, neodymium, promethium, samarium, europium, terbium, dysprosium, holmium, erbium, thulium, ytterbium, lutetium, oxide dopant clusters, and mixed combinations thereof. Other active detector layers having boron materials include boron oxide, boron nitride, boron carbide, boron carbon nitride, and boron oxynitride. Other active detector layers having lithium containing materials include lithium fluoride, lithium oxide, or lithium niobate. Still, other materials for the active layer include mixed combinations of Gd, B and Li based oxides.

Figure 8:
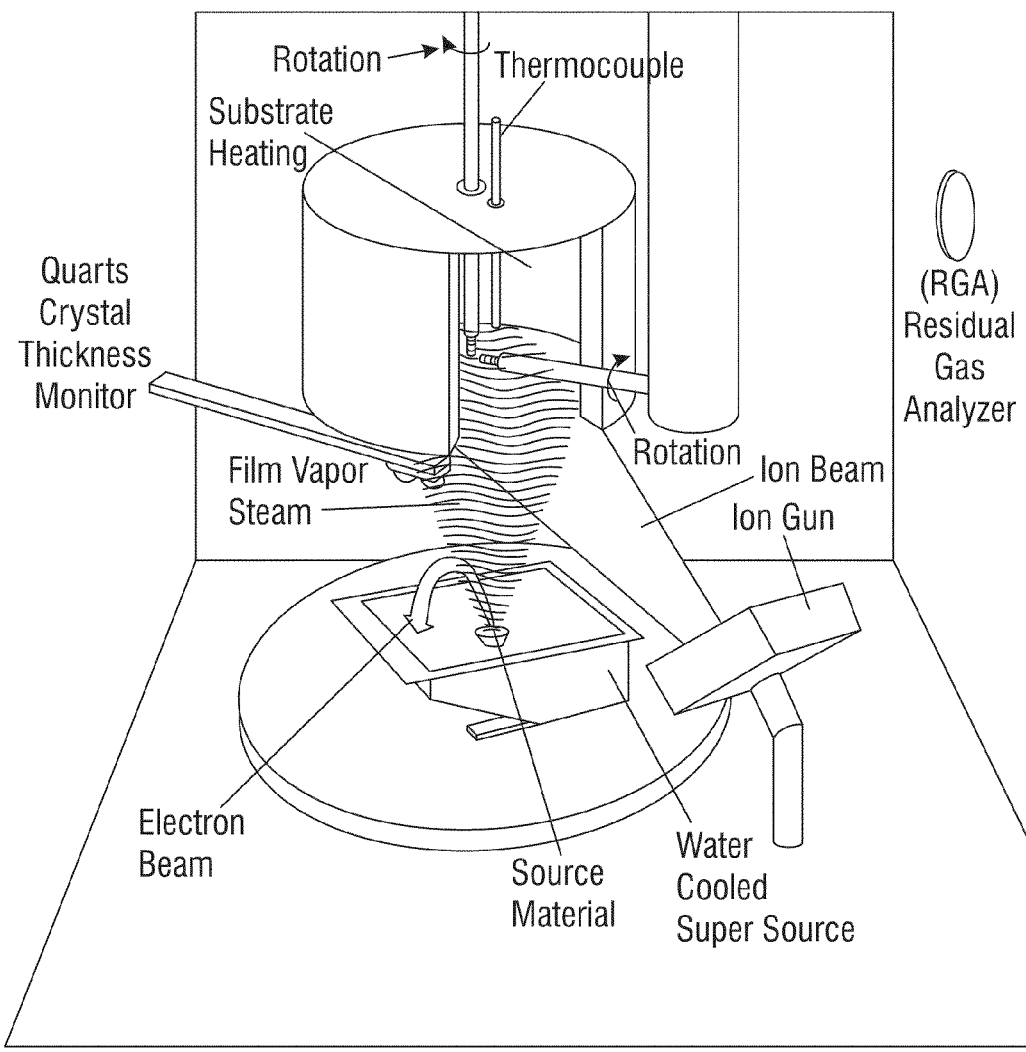
FIG. 8 is an illustration of one coating technique of the present invention.
Figure 9:
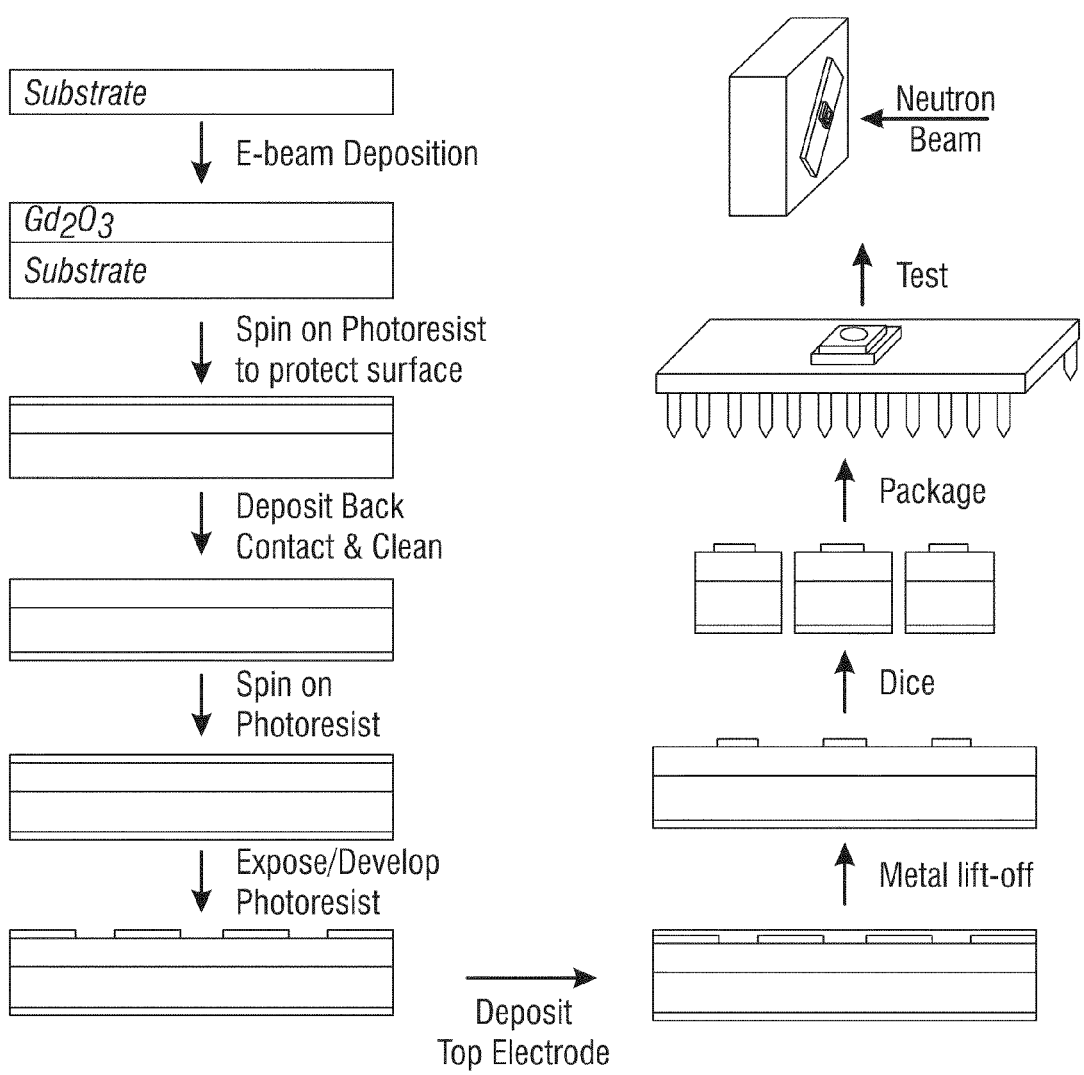
FIG. 9 is an illustration of a fabrication process for a detector according to one aspect of the present invention.

In one embodiment of the present invention, films were deposited using electron beam evaporation onto conductive silicon and sapphire ($Al_2O_3$) substrates at substrate temperatures varying from room temperature (23° C.) to 650° C. Deposition may also be accomplished via the use of any physical vapor deposition technique such as, but not limited to, electron-beam evaporation (direct, reactive, and coevaporation), atomic layer deposition (ALD), pulsed laser deposition, molecular beam epitaxy, cathodic arc, ion-beam assisted deposition, and direct or reactive sputter deposition. Alternatively, films may be deposited using any chemical vapor deposition (CVD) technique such as metal-organic CVD, Plasma-enhanced CVD, laser enhanced CVD, liquid precursor CVD. FIG. 8 illustrates one coating technique for processing $Gd_2O_3$ using e-beam evaporation. Prior to film deposition, organic contamination on the substrate was removed by soaking the substrate in acetone (~5 min), methanol (~5 min), and water (~10 sec). Subsequent to organic decontamination, and immediately prior to loading samples in the e-beam chamber, each substrate was submersed in buffered oxide etch (BOE, 6:1) for ~60 seconds to remove any native oxide that might be present. The removal of native oxides, while often done as a standard in the semiconductor industry, has not been shown to be necessary for this application of $Gd_2O_3$. Typical film thickness ranges from <1 micron up to 50 microns. This provides a means for capacitive measurements to be acquired without requiring exceedingly large voltages to be applied between the front and back contacts of the detector structure.

$Gd_2O_3$ Film Development

Figure 3A:
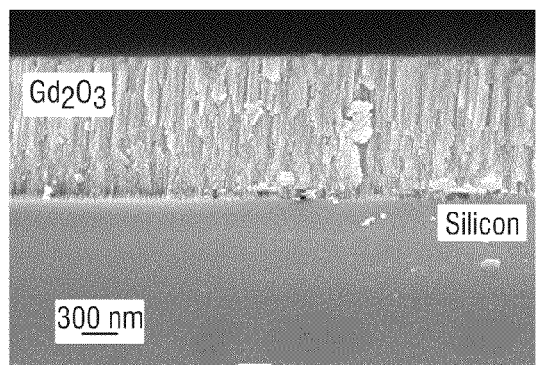
FIG. 3(a) is an SEM micrograph of $Gd_2O_3$ deposited on a silicon substrate at 650° C.
Figure 3B:
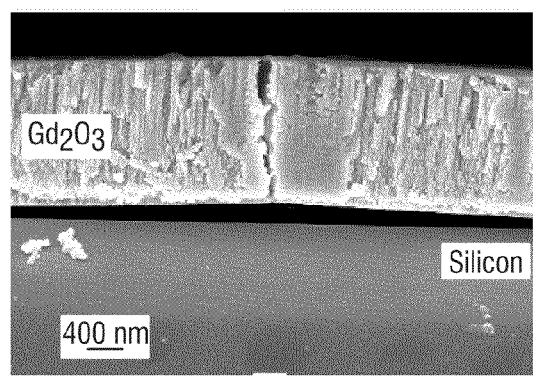
FIG. 3(b) is an SEM micrograph of $Gd_2O_3$ deposited on a silicon substrate at room temperature.

Initial experiments performed indicate that film robustness is highly dependent on deposition parameters. FIGS. 3(a)-(d) demonstrate the effects of deposition temperature on film stability. The film shown in FIG. 3(a) was deposited from 99.9% pure $Gd_2O_3$ source material under $10^{-4}$ ton oxygen ambient at 650° C. and exhibits a columnar structure. This film was subsequently heated in air at 200° C. to identify device processing robustness. As illustrates in the micrographs, the film maintained its structural integrity and was further processed for electrical characterization. On the contrary, as shown in FIG. 3(b), $Gd_2O_3$ films deposited at room temperature followed by an anneal at 200° C. experienced significant delamination and cracking, which has been linked to the presence of a low temperature phase change during heat treatment. Adding dopants, including those discussed supra, to the $Gd_2O_3$ layer will stabilize the structure and allow room and low temperature processing while adding multifunctional capabilities. Vertical metal-oxide-semiconductor (MOS) capacitors were fabricated (FIGS. 3(c) and (d)) to probe the permittivity, dielectric loss, and conductivity of the film as a result of film defect densities and structural properties.

Figure 3C:
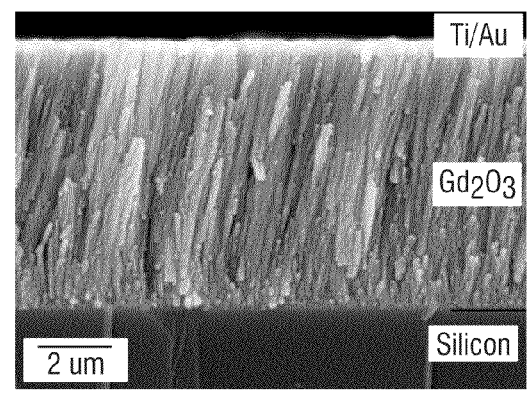
FIG. 3(c) is an SEM micrograph of $Gd_2O_3$ deposited on a silicon substrate following a heat treatment at 200° C. in air.
Figure 3D:
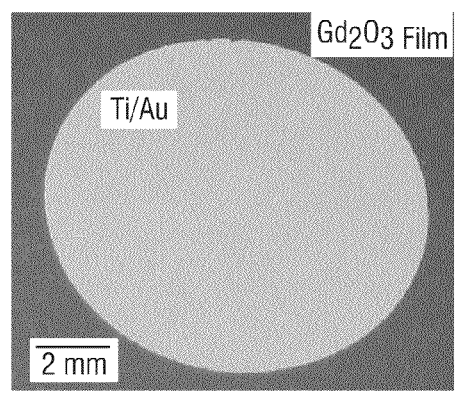
FIG. 3(d) is a plan-view optical micrograph of a completed $Gd_2O_3$-based metal-oxide-semiconductor diode according to one embodiment of the invention.

The MOS capacitor structures of the present invention are fabricated in one aspect using electron-beam evaporation of a titanium/gold bilayer, or transparent conductive oxides such as indium-tin oxide (ITO). These can also be applied by PVD, CVD, ALD, and plating techniques, hybrids, and derivative coating processes. For example, the film(s) may be applied by wafer bonding. More generally, the first layer of the metal stack is used as an adhesion layer to the $Gd_2O_3$, and can be chrome, nickel, iron, titanium, or any other easily oxidized metal. The top layer is typically a noble metal that is inherently oxidation resistant. Definition of the capacitor structure is accomplished using shadow masks or ultra-violet photolithography techniques. Pad size is chosen such that the MOS capacitors will have capacitance values ranging from a few pico-farads to a few nano-farads. FIG. 3(c) is a scanning electron micrograph of the cross section of a $Gd_2O_3$ MOS capacitor detector of the present invention. A titanium/gold bilayer was deposited on the $Gd_2O_3$ film layer on a silicon substrate. FIG. 3(d) is an optical micrograph showing a top-down view of a 0.75 cm$^2$ $Gd_2O_3$ MOS capacitor. Capacitance and conductance was measured using a semiconductor parameter analyzer.

Subsequent to $Gd_2O_3$ film deposition, middle-oxide-semiconductor diodes may be fabricated for ensuing electrical and radiation testing. FIG. 8 illustrates one fabrication and testing process for the $Gd_2O_3$-MOS diode detector of the present invention. Initially, a sample is clean to remove organic contamination using a strong organic solvent (remove or PG PRS 3000, etc.). Then backside contacts are fabricated by coating the front side ($Gd_2O_3$ film) with a protective polymer layer, and loading the samples into an electronic beam deposition chamber with the backside of the sample exposed. Once the chamber is evacuated to $1\times10^{-6}$ Torr, 100 nm of aluminum may be deposited onto the backside of the substrate. Diode structures on the front side are fabricated using standard photolithography techniques after which samples are spin coated with a one micron thick layer of ultra-violet light sensitive polymer (photoresist), placed in contact with a quartz plate containing multiple circular patterns made of chrome, exposed to UV light, and developed in tetramethylammonium hydroxide. Then, 20 nm titanium (or chrome, nickel or the like) and 100 nm gold bi-layer coatings are applied. The finished $Gd_2O_3$-MOS diode detector may then be diced into 1×1 cm chips that include at least one diode each. The chips may then be mounted face-up in a ceramic dual in-line microelectronic package (CERDIP) for insitu neutron detection. One diode per chip is wire-bonded to a single pin in the package. Electrical contacts to the front and backside metallization is then made through pins in the CERDIP. Real-time monitoring of electrical properties of the detector before, during and after radiation exposure is performed using a Keithly 4200 semi-conductor parameter analyzer via BNC cabling for measuring both the elastic (recoverable) and plastic (non-recoverable) responses to varying neutron influences.

Electrical characterization of the $Gd_2O_3$-MOS diode detector includes current-voltage (I/V) and capacitance-voltage (C/V) testing and evaluation. Each parameter is provided a means to extract electronic properties such as film permitivity, conductance, loss and total capacitance as a function of neutron exposure from the detector. A key measure of detector sensitive is the change in conductivity ($\Delta G$) that is measured insitu. Conductance changes are measured according to: $\Delta G = \Delta Q = Idt_{@V=1}$ where $\Delta Q$ is the change in charge and $Idt_{@v=1}$ is the incremental change in current (I) at a constant voltage (V) with time. The detector may then be monitored for increased conductivity using a semiconductor parameter analyzer at a fixed voltage at approximately 1 Volt, as the presence of neutrons result in a change in current over time (I dt), which registers as radiation-induced conductivity ($\Delta G$). Additionally, variation in diode capacitance can be measured according to: $I = dQ/dt = C\, dV/dt$ where C is Capacitance, Q is charge, and V is the applied voltage responsible for the field causing the polarization of the medium inside the capacitor structure. Since physical charge cannot pass through the dielectric layer of the $Gd_2O_3$ diode detector, it accumulates equal quantities on the front and back contacts. Thus, the accumulated charge on the electrodes is equal to the integral of the current, as well as being proportional to the voltage. The present invention contemplates that a combination of both capacitance and conductance, and looking at a ratio of change between the two, to detect radiation and the type of radiation. Thus, the present invention lends itself to multiple detection modes, such as a capacitance-based structure, and conductance-based structure, and a hybrid capacitance/conductance-based structure for detecting radiation.

Where neutron radiation is present, gamma photon radiation is also present, either from natural background or from the source itself. Thus, the detector of the present invention is configured to respond to each type of radiation. Using the $Gd_2O_3$-based neutron detector of the present invention it is possible to utilize the different interaction mechanisms of gamma photons and neutrons to deconvolve the contribution of each radiation. Since the gamma photons interact with orbital electrons, the gamma interaction rate in the detectors are dependent on the materials physical density, while the neutron interaction rate is dependent on the concentration of the neutron absorbing isotope. The relative low density and thickness of the $Gd_2O_3$ film make it relatively insensitive to gamma radiation, while the high neutron cross section of the Gd results in a relatively high sensitivity to neutrons, especially low energy neutrons.

Radiation Evaluation of $Gd_2O_3$ MOS Diode Capacitors

Detection of neutrons and other radiological decay species is greatly dependent on the primary and secondary radiation signatures resulting from neutron interactions with the detector material. Solid-state radiation detection is attractive not only because of the superior energy resolution, but also because detectors are physically robust, can operate with zero cooling, and require voltages of <100V. Furthermore, charge-based detection is likely the simplest form of solid state detection, requiring only basic electronics for charge measurement in the form of an electrical current.

Figure 4A:
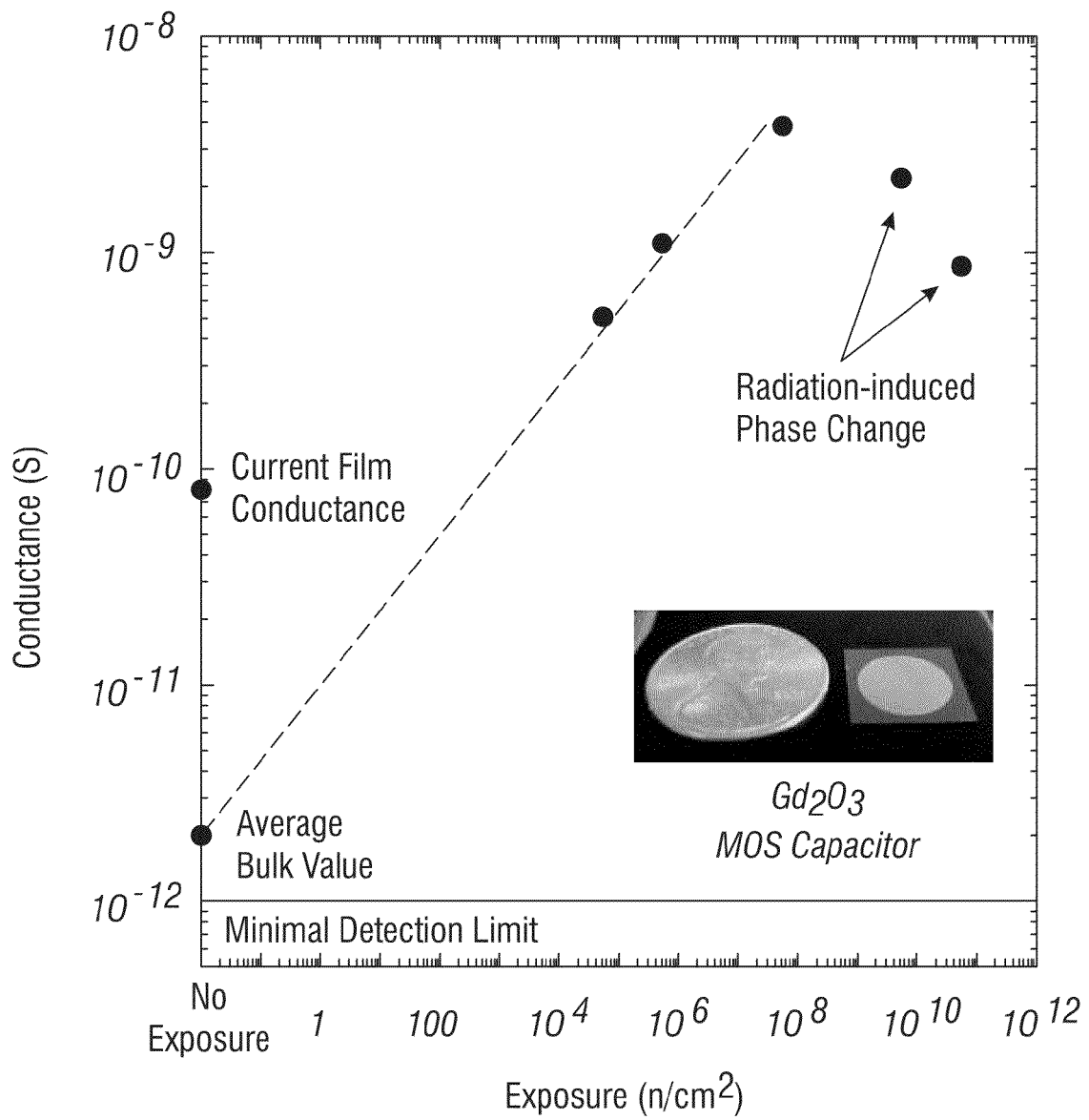
FIG. 4(a) is a plot illustrating $Gd_2O_3$ conductance versus thermal neutron exposure, and includes an inset showing the relative size of a $Gd_2O_3$-based solid-state detector relative to a U.S. $0.01 coin 'penny'.
Figure 4B:
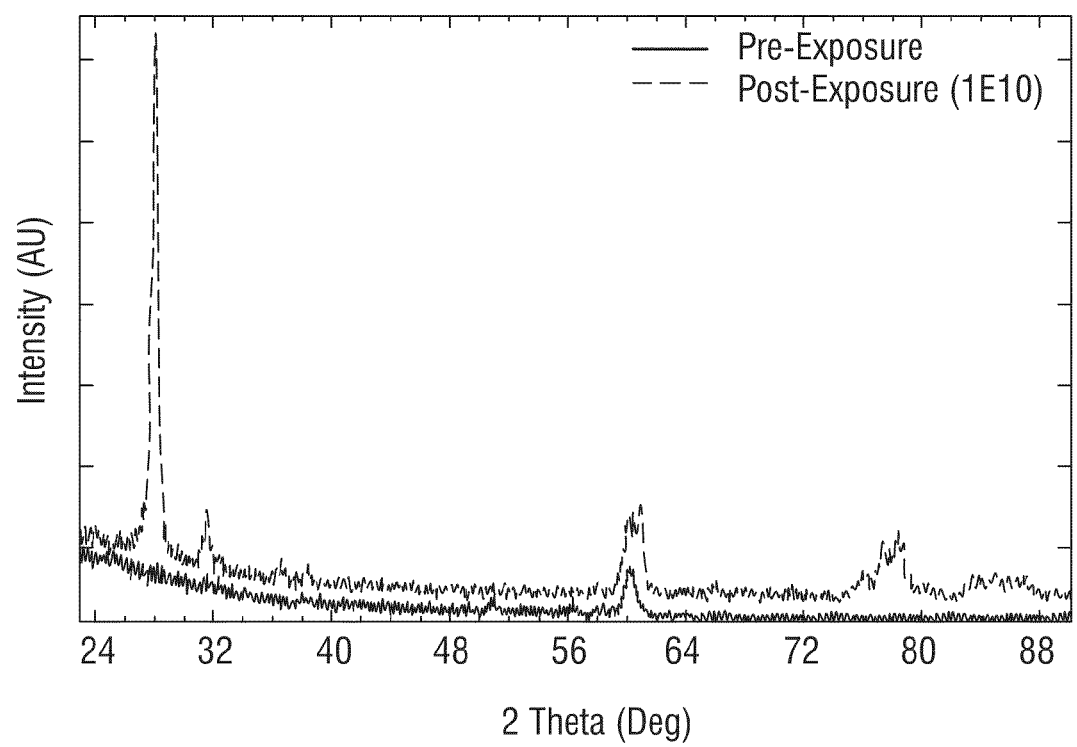
FIG. 4(b) is a plot illustrating a comparison of x-ray diffraction data of a $Gd_2O_3$ film before and after exposure to $5.5 \times 10^9$ n/cm$^2$.
Figure 4C:
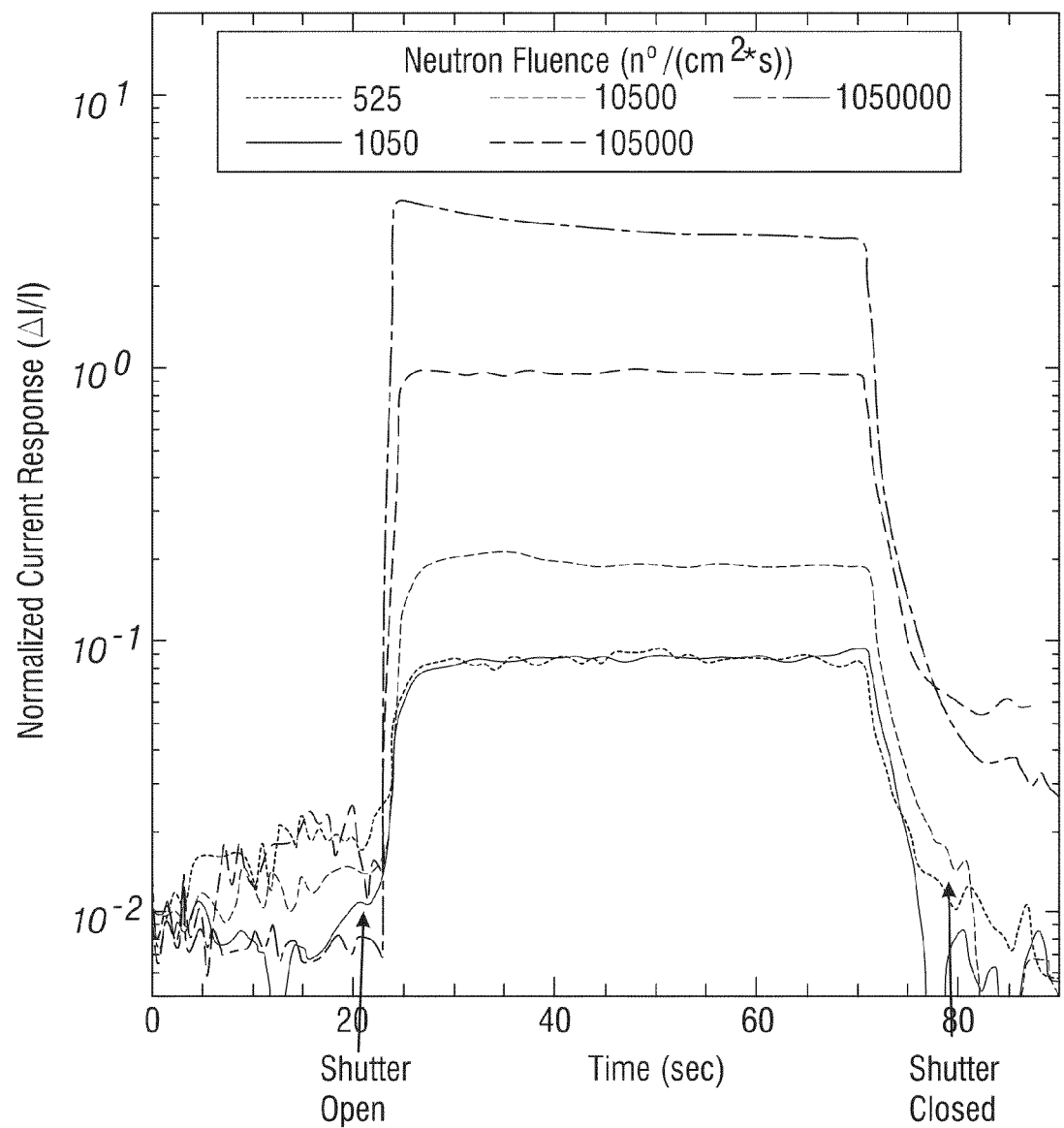
FIG. 4(c) is a plot of the real-time response of $Gd_2O_3$-based capacitor diodes when exposed to varying doses of thermal neutrons.
Figure 4D:
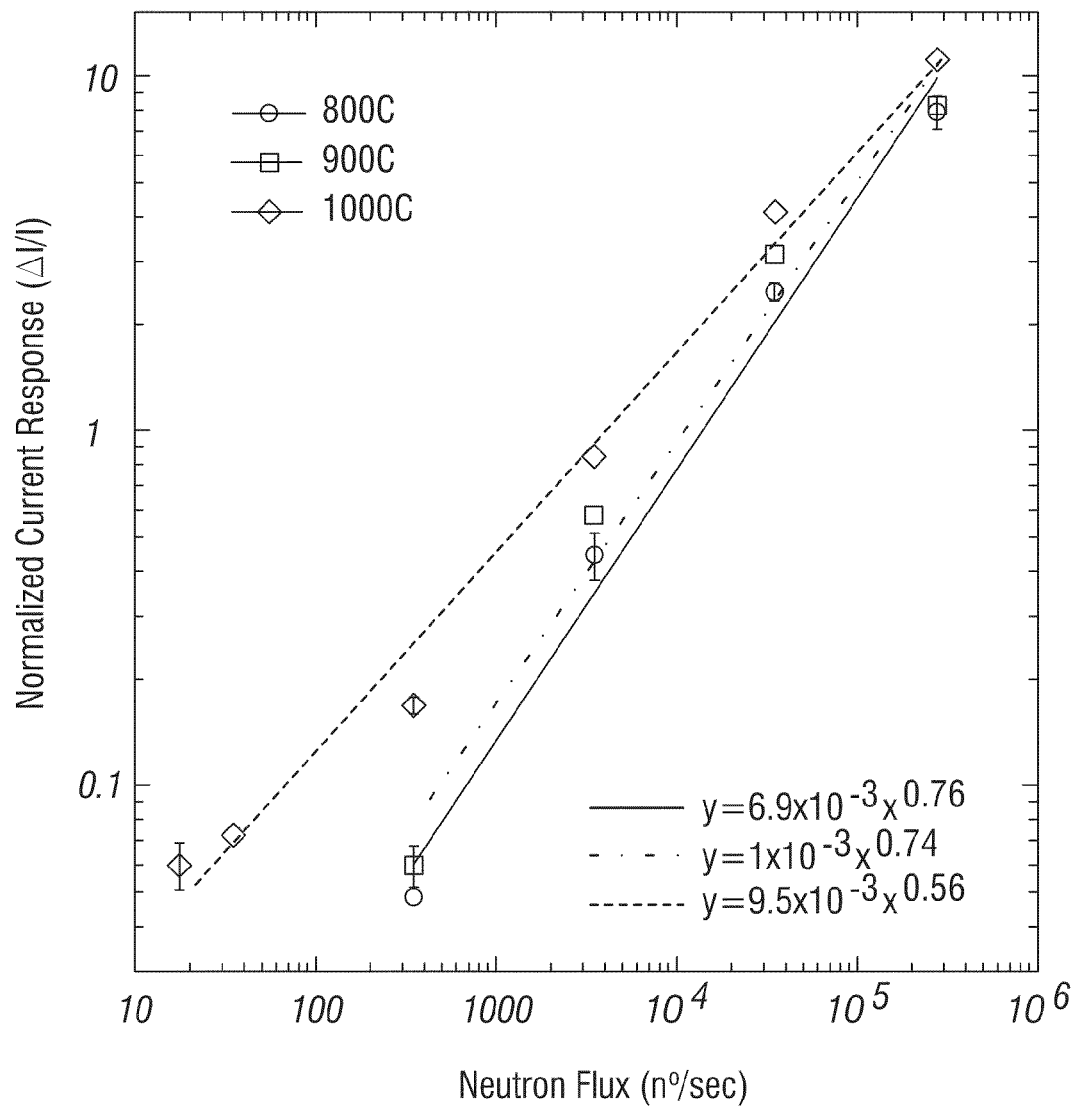
FIG. 4(d) is a plot illustrating the normalized conductance response of $Gd_2O_3$-based capacitor diodes as a function of oxygen annealing temperature of the $Gd_2O_3$ film during real-time testing.
Figure 7A:
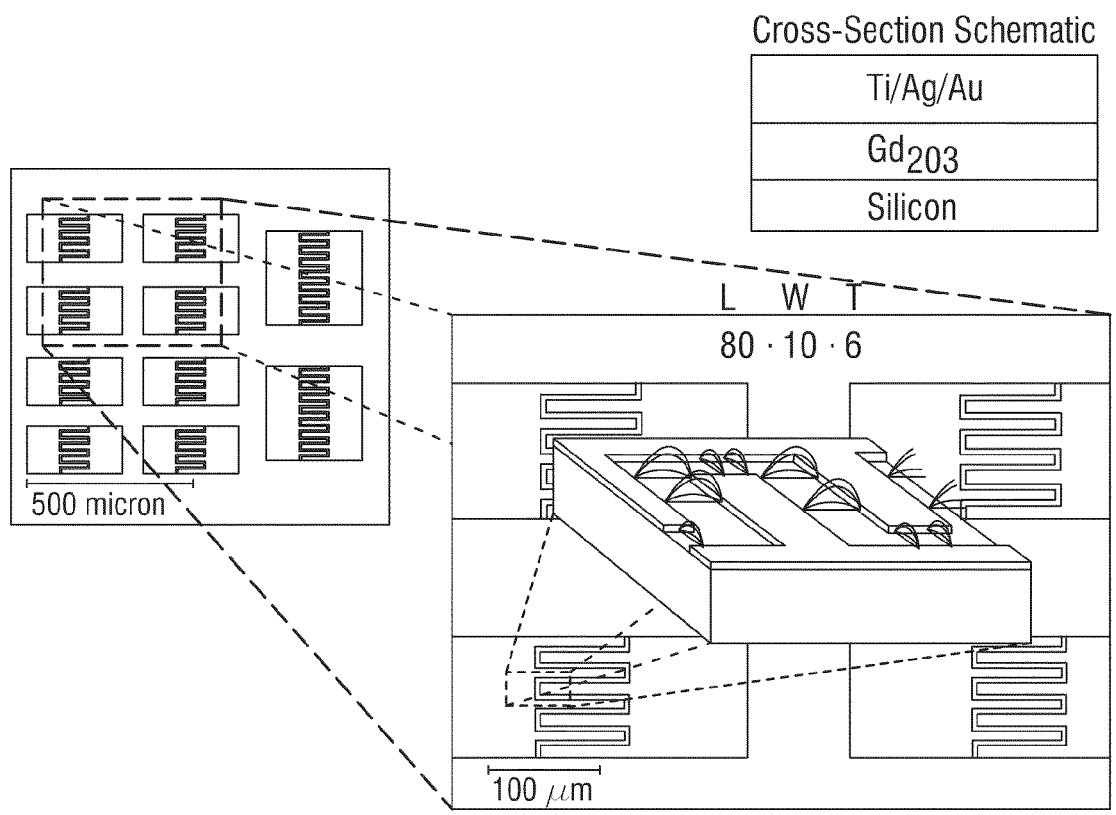
FIG. 7(a) is an illustration of size and cross section of a detector according to one embodiment of the present invention.

The present invention evaluated $Gd_2O_3$ MOS diode capacitor structures in a nuclear research reactor to develop a fundamental understanding of the nuclear radiation interactions with $Gd_2O_3$ at non-cryogenic temperatures. Test results verify that $Gd_2O_3$ is an excellent candidate as the active material for radiation detection. Films ranging in thickness between 0.5-50 microns, but thinner than 10 microns were deposited at 650° C. and subsequently fabricated into 0.75 cm$^2$ and 0.017 cm$^2$ $Gd_2O_3$-based MOS structures (see inset image to FIG. 4(a), comparing the 0.75 cm$^2$ MOS Capacitor to the size of a penny). FIG. 7(a) provides another illustration of size and cross section of the detector. The conductivity of the prototype structures were subsequently measured before and after thermal neutron exposures of $5.5\times10^4$, $5.5\times10^5$, $5.5\times10^7$, $5.5\times10^9$, and $5.5\times10^{10}$ n/cm$^2$. FIGS. 4(a)-(b) display the conductance of the $Gd_2O_3$ MOS prototypes before exposure and following each subsequent exposure. The increase in conductivity above that of bulk $Gd_2O_3$ is demonstrated in FIG. 4(a) up to an exposure level of ~1×10$^8$ n/cm$^2$. The increased conductivity is likely due to the neutron/Gd interaction that results in an ejection of an electron (see also FIG. 1(a)). The measured change in conductivity was done ex-situ and is considered to be characteristic of permanent damage from the n/$Gd_2O_3$ interaction. In addition, a structural phase change seen at >800° C. is present at $5.5\times10^9$ n/cm$^2$ (see FIG. 4(b)), confirming that significant localized Joule heating can occur during irradiation. This phase change is also combined with a reduction of conductivity, indicating significant damage of the film has occurred during irradiation. The $Gd_2O_3$ based solid state detectors have a substantial real-time detection of neutrons during exposure that can be divided into recoverable (elastic) and non-recoverable (plastic) deformation mechanisms allowing for tailorability, and the possible reduction or even elimination of false positives. In addition to ex-situ measurements, in-situ measurements were accomplished on $Gd_2O_3$ films that were oxidized in an $O_2$ environment as a means to increase the $O_2$/Gd ratio for improved capacitor performance. FIG. 4(c) illustrates the real-time RIC response to increased doses of thermal neutrons. As also observed in FIG. 4(c), a rapid rise in current occurs when the neutron beam is turned on, current modulation as high as 400% and nearly 100% current recovery to its original value when turned off, demonstrating the radiation induced conductivity (RIC) of the detector. FIG. 4(d) directly compares several $Gd_2O_3$ films that have been annealed at 800° C., 900° C., and 1000° C. prior to capacitor diode fabrication. This test was used to identify the effects of oxygen deficiency in $Gd_2O_3$ films on the radiation sensitivity of the MOS capacitor structures.

The present invention provides, amongst other things, $Gd_2O_3$ as a compact, low power solid-state neutron detector in which $Gd_2O_3$ is the active material that converts and detects nuclear decay products simultaneous. Embodiments may vary recognizing other factors contribute to the performance of the neutron detector, such as the coating/film deposition process parameters, coating microstructure, thickness, crystallographic structure/phase, residual stress state, material defects, oxygen deficiency, crystallinity, grain size, and film density of a $Gd_2O_3$-based detector, and will affect the sensitivities to nuclear materials. Acute and chronic effects of the $Gd_2O_3$ electronic properties, as a function of neutron exposure via in-situ characterization, may further enhance the sensitivities of the detectors. Furthermore, one can discriminate between n$^0$/$Gd_2O_3$ interactions and those related to the presence of gamma radiation, allowing additional modes/ levels of multiple detection including gamma and charged particle irradiation on film conductivity, microstructure, and integrity.

Neutron Detection Mechanisms

Compared to the current state of the art solid state detectors, the advantages of the proposed $Gd_2O_3$-based detection method include several modes of detection (multiple detection mechanisms) that have the ability to:

- Measure charge providing electrical (conductance and capacitance) detection;
- Measure magnetism (Gd is ferromagnetic);
- Determine spin orientation;
- Be used as a Dose-based switching mechanisms due to joule heating;
- Tailorability with rare earth oxide dopant clusters; and
- Determine presence of nuclear radiation based on microstructural changes or crystal structure transformations.

Figure 7B:
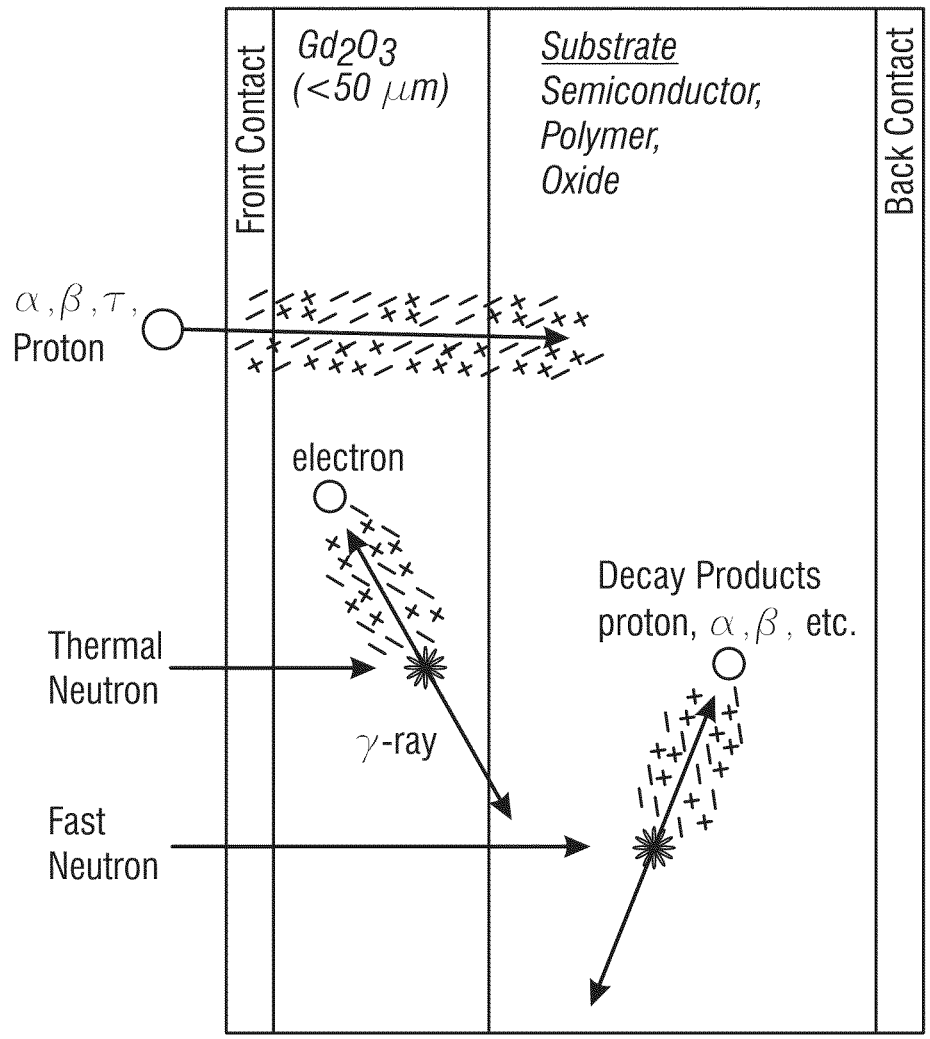
FIG. 7(b) is a sectional view of one embodiment of the $Gd_2O_3$ capacitor diode detector illustrating potential charge carrier generation mechanisms.

For example, when neutrons are detected by the $Gd_2O_3$-based detector, one or several of the previously mentioned detection mechanisms can occur. This allows for selectivity with regards to measuring nuclear materials, as well as increasing the detection limits. Thus, the $Gd_2O_3$-based detector of the present invention provides a solid-state detector that simultaneously converts and detects nuclear radiation. While other solid-state detectors use gadolinium (Gd) metal, lithium-based (Li), and boron-based (B) thin films, these films are passive components in the detection architecture which serve only to convert incoming neutrons into charged particles (called converter films) that are detected by a semiconductor diode in direct contact with the converter film; thus, converter films do not detect the presence of a neutron. In nuclear reactions, daughter particles are emitted in opposite directions once the host atom interacts with the incoming neutron; as a result, converter film and/or semiconductor diode-type architectures cannot guarantee that every incoming neutron that interacts with the converter film will be detected/sensed by the underlying semiconductor material. Since the proposed $Gd_2O_3$-based detector uses $Gd_2O_3$ as the converter and active material (active material is defined here as that part of the detector that is used to identify the presence of nuclear radiation) in the detector architecture, all charged particles resulting from the nuclear radiation/$Gd_2O_3$ interactions will be captured and registered. FIG. 7(b) is a cross sectional view of one embodiment of the $Gd_2O_3$ capacitor diode detector with potential charge carrier generation mechanisms when the detector structure interacts with the decay products. Note that charged or ionized particles will induce charge carriers even without the need for conversion or reaction, thermal neutrons will interact directly with the $Gd_2O_3$ creating an excess of electrons, and fast neutrons will interact with the substrate that results in an additional nuclear reaction and ejection of additional charged particles. Each of these interactions results in an increase charge carrier density that may be translated into a current or capacitance pulse. It is the combination of the current and capacitance pulse that could provide a finger print of specific decay products that would be utilized as a basis for forensic detection of nuclear radiation. For example, capacitance could be used to detect flow energy radiation, conductance to detect high energy (fast) neutrons, and both could be used to simultaneously detect low and high energy neutrons in combination. Additional tailoring of the detector could be accomplished by doping the $Gd_2O_3$ detector system with multiple dopants, such as those provided and discussed supra, for creating a multitude of detections schemes for detecting radiation such as change in magnetism and/or change in electron spin, or like detection schemes involving change in physical structure of the materials of the detector when exposed to radiation.

The detector of the present invention provides benefits over traditional nuclear detectors, such as for example zero cooling requirements; low power (~1V) operation with capabilities of zero power when used as the active material in an RFID; low cost; light weight; transparent; flexible when utilized on polymer substrates; very large area; lower noise; and environmentally and physically robust. The $Gd_2O_3$ detector requires no current circuit to display detection, and therefore does not require use of any external power, such as power needed to operate and power the capacitor, preamplifier, low level discriminator, or pulse counter. Furthermore, the $Gd_2O_3$ detector requires no extra time for the detector to cool, such as in high radiation fields.

Applications for $Gd_2O_3$-based Neutron Detectors

Figure 5:
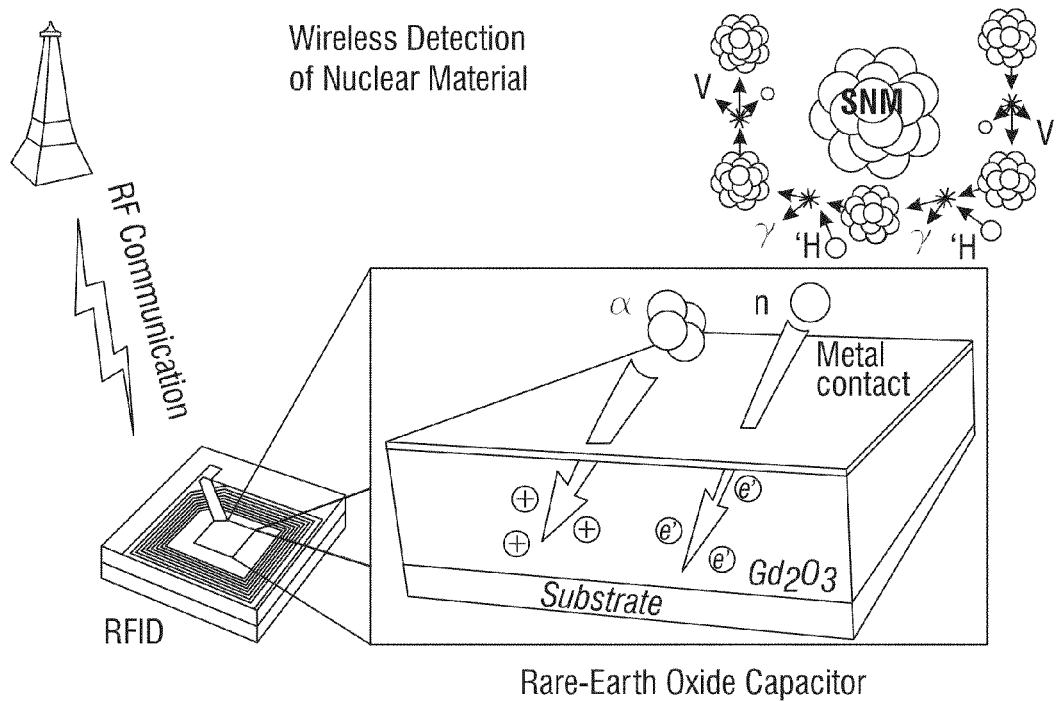
FIG. 5 is an illustration of wireless detection of nuclear materials using radio-frequency identification tags to detect nuclear radiation from a distance.
Figure 6:
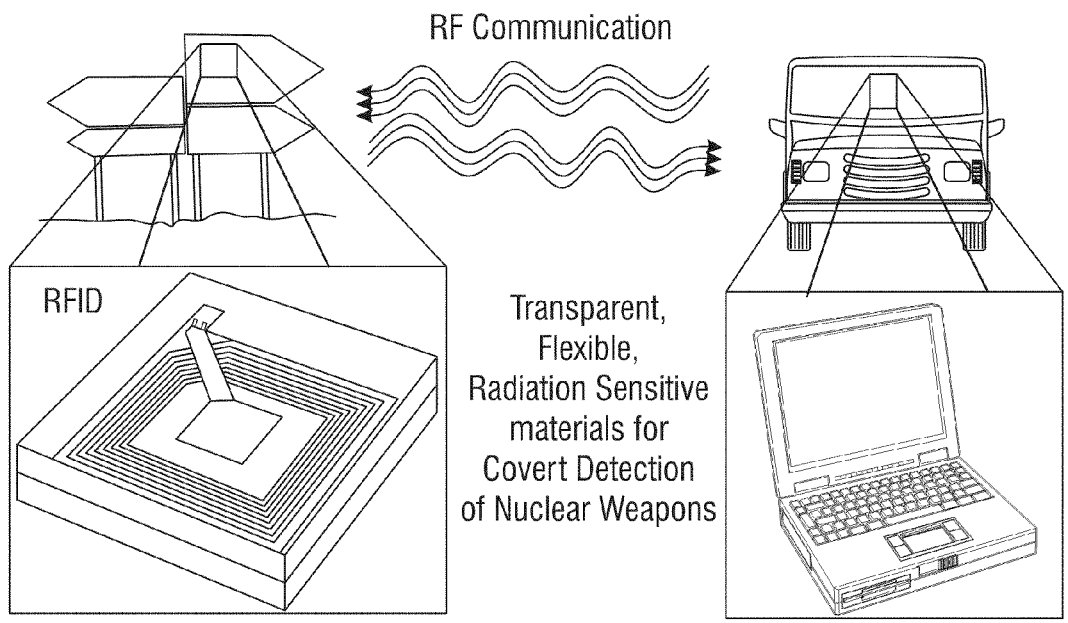
FIG. 6 is an illustration of potential applications for radio-frequency identification tags on road signs that can be used to detect nuclear radiation from a distance.

Potential applications for the $Gd_2O_3$-based neutron detector are illustrated in FIGS. 5-6, in which wireless detection of nuclear materials using radio-frequency identification (RFID) tags could be used for large standoff distances and radio frequency (RF) communication to protect the warfighter by detecting nuclear radiation from a distance. Other potential applications include but are not limited to application of the $Gd_2O_3$-based neutron detector in:

- Car windows/windshields
- Airplane windows, structural components
- Building windows/architecture
- Sensors
- Warfighter apparel including eye glasses, night vision goggles, riflescopes
- Road signs and radio towers
- Solar cells
- Components comprised of glass
- Military vehicle components
- Boats/Ship components The present invention also contemplates the use of $Gd_2O_3$-based neutron detectors that could be dropped from aerial vehicles, including helicopters or airplanes, into suspected areas of nuclear activity for detecting weapons of mass destruction. Also, as shown in FIG. 7, the transparent flexible, robust $Gd_2O_3$-based detectors could be attached to road signs along important corridors for detecting, monitoring nuclear events. Due to the flexibility in size, shape, and robustness, numerous potential applications exist. The applications that are conceivably within the scope of the present application are too many to list, but are contemplated as circumstances or various situations may suggest.

The preferred embodiment of this invention has been set forth in the drawings and specification and those specific terms are employed, these are used in the generically descriptive sense only and are not used for the purposes of limitation. Changes in the formed portion and parts as well as in the substitution of equivalents are contemplated as circumstances expressed are rendered expedient without department from the spirit and scope of the invention as further defined in the following claims.

What is claimed is:

1. A solid-state nuclear radiation detector comprising:
a substrate layer having a reaction response and a detection response, the reaction response being detected in the substrate layer from the detection response for detecting at least fast neutrons associated with a radiation source;
an active material layer deposited in contacting relation onto said substrate layer, the active material layer itself having both a conversion response adapted to convert neutrons into charged particles and a detection response adapted to detect the presence of neutrons in at least thermal neutrons associated with the radiation source to increase charge carrier density of the detector; and together at least said substrate and active material layer for detecting charged or ionized particles associated with the radiation source.

2. The detector of claim 1 further comprising at least two separate detection modes using electrical properties of the substrate and active material layers for detecting a type of radiation associated with the radiation source.

3. The detector of claim 2 wherein the detection modes comprise a capacitance pulse detection mode and a conductance pulse detection mode.

4. The detector of claim 2 wherein the detection modes comprise a capacitance pulse detection mode, a conductance pulse detection mode and a combination of capacitance and conductance pulse detection mode.

5. The detector of claim 2 wherein one of the detection modes uses structural properties of the substrate and active material layers for detecting the type of radiation associated with the radiation source.

6. The detector of claim 2 further comprising a comparator having one or more inputs to receive a response from the at least two separate detection modes, the comparator having one or more outputs with a measured ratio of change between the at least two separate detection modes for detecting the type of radiation associated with the radiation source.

7. The detector of claim 2 wherein one of the detection modes comprises a combination of a capacitance pulse detection mode and a conductance pulse detection mode.

8. The detector of claim 1 wherein the substrate layer comprises a metal, a ceramic, a polymer, or a combination of the same.

9. The detector of claim 1 wherein the active material layer comprises a dielectric insulator being sensitive to or absorbing neutron radiation.

10. The detector of claim 1 wherein the active material layer comprises a Gadolinium-oxide material layer having oxide cluster dopants.

11. A method for detecting nuclear radiation comprising:
depositing a radiation sensitive film onto a substrate;
attaching a contact to the film to form a solid-state detector;
exposing the solid-state detector to radiation; and
detecting a reaction response from one or more fast neutrons within the substrate having a fast neutron detection response; and
detecting thermal neutrons with the radiation sensitive film itself having both a conversion response adapted to convert neutrons into charged particles and a detection response adapted to detect the presence of neutrons, and charged or ionized particles with both the substrate and radiation sensitive film.

12. The method of claim 11 wherein the detecting step comprises monitoring at least two separate detection modes using electrical properties of the substrate and radiation sensitive film for detecting the type of radiation.

13. The method of claim 12 further comprising the step of detecting a measured ratio of change between the at least two separate detection modes for detecting the type of radiation associated with a radiation source.

14. The method of claim 12 further comprising the step of detecting radiation by conductance pulse detection.

15. The method of claim 12 further comprising the step of detecting radiation by combining capacitance pulse detection and conductance pulse detection.

16. The method of claim 11 further comprising the step of converting said neutrons into charge particles for detecting radiation by capacitance pulse detection.

17. The method of claim 16 wherein the detecting and converting steps occurring simultaneously for providing detection of radiation.

18. The method of claim 11 further comprising powering the detector with less than 1 volt.

19. The method of claim 11 wherein the radiation sensitive film comprises one of:
a. a Gadolinium-oxide radiation sensitive film;
b. a rare-earth oxide radiation sensitive film;
c. a transparent nuclear radiation sensitive film.

* * * * *